(12) United States Patent
Chan et al.

(10) Patent No.: US 7,475,152 B2
(45) Date of Patent: Jan. 6, 2009

(54) APPROACH TO PROVIDE SELF-PROTECTION FUNCTION TO WEB CONTENT AT CLIENT SIDE

(75) Inventors: Hoi Yeung Chan, Stamford, CT (US); Trieu C Chieu, Scardsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 10/945,105

(22) Filed: Sep. 20, 2004

(65) Prior Publication Data

US 2006/0064463 A1    Mar. 23, 2006

(51) Int. Cl.
*G06F 15/16* (2006.01)
*H04L 9/00* (2006.01)

(52) U.S. Cl. ............... 709/229; 709/217; 709/246; 713/150

(58) Field of Classification Search ............ 709/229, 709/246, 217; 713/150
See application file for complete search history.

(56) References Cited

U.S. PATENT DOCUMENTS

2002/0138446 A1* 9/2002 Antonin et al. ............ 705/67
2003/0023850 A1* 1/2003 Brown et al. .............. 713/176
2006/0213969 A1* 9/2006 Russell et al. ............ 235/375

* cited by examiner

*Primary Examiner*—Patrice Winder
*Assistant Examiner*—Tanim Hossain
(74) *Attorney, Agent, or Firm*—George A. Willinghan; August Law Group LLC.

(57) ABSTRACT

The present invention utilizes agents embedded in content delivered to clients across a network to provide client-side security for the data delivered to a client. These embedded agents provide application-specific protection for the delivered content in which they are embedded and eliminate the need for using plug-ins for security functions. Different agents, e.g. programs such as Java applets, are configured having a variety of different client or application specific protection mechanisms, and the agents are dynamically configured, e.g. selected, in accordance with the application, the client to be protected or other environment criteria. Once the agent has been appropriately configured, the agent is embedded in the content, and the content is delivered to the client. Once delivered, the embedded agent is uploaded to the client and executed, providing the configured security protection at the client side for the content in which it was embedded.

24 Claims, 3 Drawing Sheets

APPROACH TO PROVIDE SELF-PROTECTION FUNCTION TO WEB CONTENT AT CLIENT SIDE

FIELD OF THE INVENTION

The present invention relates to computer network security.

BACKGROUND OF THE INVENTION

As the complexity and use of web applications increases, there is an increasing need for software systems that can handle this increased level of complexity and that can facilitate the construction of integrated enterprise systems. Software systems have been developed that take advantage of agent technology to handle this increased complexity and the integration of enterprise systems. In general, agent technology utilizes agents, which are extremely high level software abstractions that provide a convenient and powerful way to describe a complex software entity and to build solutions such as integrated enterprise solutions. Agents define complex entities in terms of the behaviors associated with those entities; therefore, solutions can be constructed by simply identifying the desired behaviors. Systems constructed using agent technology can be used to perform a variety of tasks autonomously.

Traditionally, the development of agents and related technologies focused on creating systems for conducting tasks such as searching, mining, comparing, negotiating, learning and collaborating. Systems directed to security and to the protection of data in network settings have not been developed. In fact, very little development effort has been devoted to autonomic data protection systems. Data protection systems are particularly important in protecting data content once the data have been delivered from a server to a client across a network.

A minimum level of protection is afforded to the data in the network by disconnecting and logging users out of the network after a pre-determined period of non-activity on the part of a user. By closing user connections into the network and the associated access to network data, access to data across the network by unauthorized third parties is inhibited. Even though the portal into the network is closed, data, including sensitive and proprietary information, that have already been delivered to a client from the network can still be accessed by unauthorized third parties at the client. Network access is not required to access data that are resident on a user's computer. Therefore, user equipment associated with a network client that is left unattended presents an opportunity for unauthorized access to data. Network interfaces, for example web browsers, do contain tools, i.e. plug-ins, that offer limited, pre-defined and generalized protection functionalities. However, the level of protection afforded by these tools is generally low, and the tools lack the flexibility necessary to configure themselves dynamically to meet individualized needs.

Therefore, systems and methods are needed to protect data delivered and stored at a client beyond what a typical network interface or browser provides. The protection systems would eliminate the need for using either existing tools or plug-ins or other additional or proprietary plug-ins to provide the desired protection and security for data delivered to clients in the network. The systems would be flexible and customizable to the particular application in which they are deployed.

SUMMARY OF THE INVENTION

The present invention is directed to systems and methods for providing client-side security for data delivered to a client in a network setting. These systems and methods utilize intelligent agents embedded in the content, e.g. data and messages, delivered to the client. These embedded agents provide application-specific protection for the delivered content in which they are embedded. The use of embedded intelligent agents eliminates the need for using plug-ins and significantly enhances protection flexibility. Therefore, security functions are provided that are tailored in accordance with the data, the client or both the data and the client. For example, different agents, e.g. programs such as Java applets, can be configured having a variety of different client or application specific protection mechanisms. These different agents can be dynamically configured, e.g. selected, in accordance with the application, the client to be protected or other environment criteria. Once the agent has been appropriately configured, the agent is attached to the content, for example messages or data, to be delivered to the client, and the content is delivered. Once delivered, the agent is uploaded to client side equipment and executed to provide the selected protection to the delivered content on the client side of the network.

DETAILED DESCRIPTION

Figure 1:
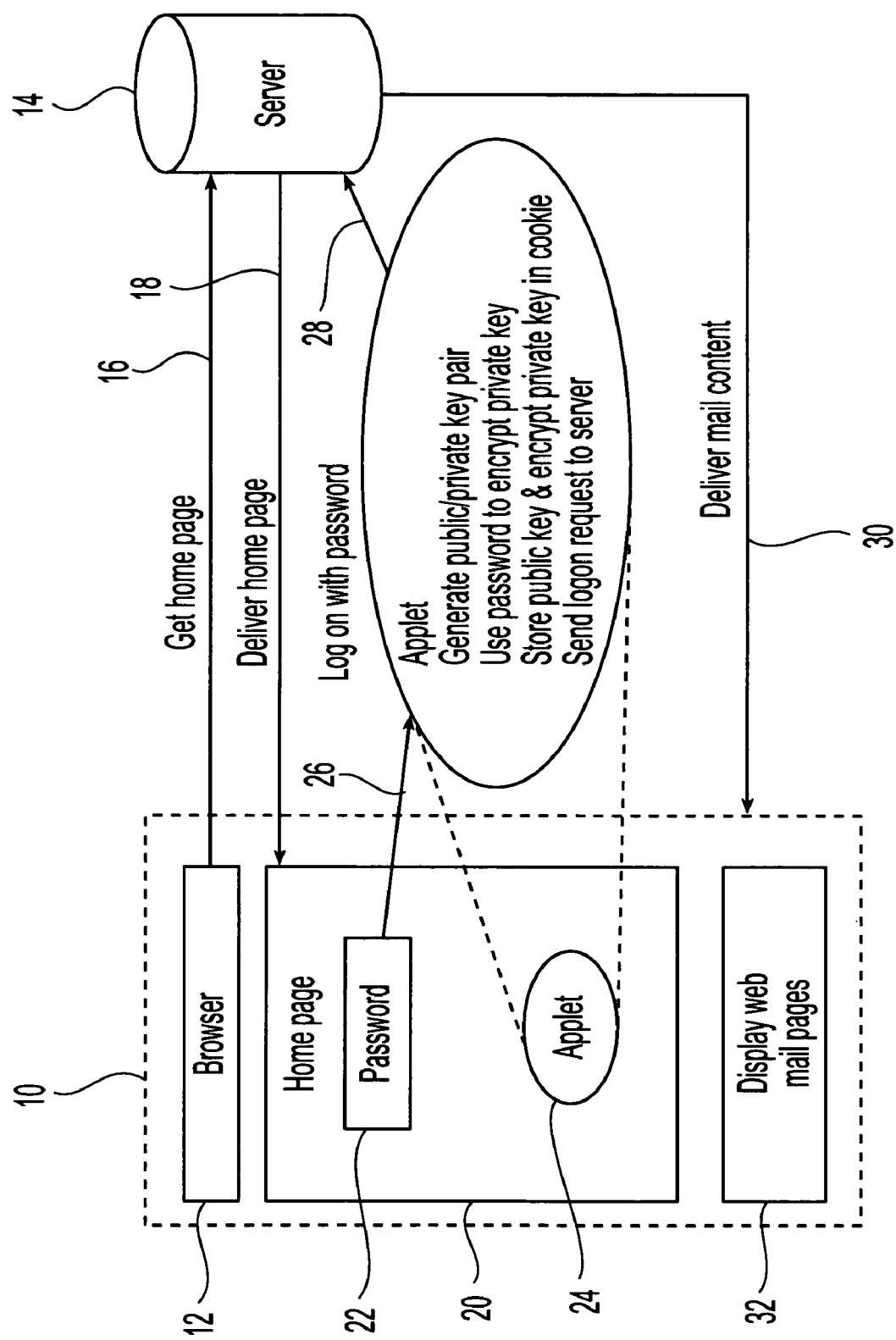
FIG. 1 is a schematic representation of an embodiment of generating a public/private key pair and an encrypted private key in accordance with the present invention.

The present invention is direct to the use of intelligent agents embedded in the data content delivered to clients from servers across a network to provide client-side security and protection for the delivered content. In particular, the invention proposes a time-out protection scheme for web data delivered to a client that uses a double-encryption algorithm to lock and store delivered content locally at the client side to avoid security exposure. The double-encryption algorithm combines public/private key encryption with a user login password to act as a secret key for encoding the private key. The embedded agent approach of the present invention not only eliminates the need for plug-ins but provides functions tailored to specific content and user needs. Therefore, different agents, for example Java™ applets, having different protection mechanisms are dynamically configured and included in the delivered content based on the data in the content, information about the client to which the content is delivered and other environment criteria.

In general, for web-based applications, a browser facilitates selection by the user of a link to a page of information or data and retrieval of this information or data to the user's system for display on the user's display screen. The browser itself does not facilitate significant manipulation of the data. However, agent technology and plug-in technology allow extension of browser functions, and provide additional functionalities in the browser environment. Therefore, it becomes possible to include a set of functions embedded in the retrieved information or data content that implements the various protecting functions by using agent technology. Any general purpose programming language that is capable of running independently on client-level equipment can be used to construct the embedded functions or agents. Preferably, the programming language is platform-independent. In addition, the programming language facilitates the inclusion or embedding of the agent in the content that is delivered to clients across the network. Suitable programming languages include Java, which is a registered trademark of and commercially available from Sun Microsystems, Inc. of Mt. View, Calif. A Java agent, for example an applet, is a program written in the Java programming language that can be included or embedded in the content, e.g. an Internet page or a hypertext markup language (HTML) document, that is delivered to the client across the network. Inclusion of the agent can be accomplished through mechanisms similar to the inclusion of images, text or data.

In one embodiment, the embedded functions are dynamically configured in accordance with application specific factors. These application specific factors include the nature of the data included in the delivered content, an identification of the client to which the content is delivered, an identification of the software applications running on the client and combinations thereof. In one embodiment, dynamically configuring the embedded agents includes selecting the embedded agents, for example from a database of agents, based upon the application specific factors. Configuring the embedded agents based upon an identification of the client and an identification of the software applications running at the client facilitates execution of the agents at the client level.

After the agent is selected, the agent is attached to or embedded in the content to be delivered to the client across the network and is delivered to the requesting client. Upon receipt of the content, the embedded agent is loaded onto the equipment or computer system associated with the client and is executed. In one embodiment, an identification of the client and the software applications running on the client equipment indicate that the client is using a Java technology-enabled browser to view, for example, Internet pages. Therefore, a Java applet is selected as the agent. The Java applet is embedded in the requested content, e.g. a web page, and the content is delivered to the requesting client. Upon receipt at the client, the code contained in the Java applet is loaded onto the equipment at the client and is executed by the Java Virtual Machine (JVM) provided in the Java technology-enabled browser.

In one embodiment, a separate agent can be embedded and forwarded with each request for content. Alternatively, a separate agent is not included with each content delivery. For example, an agent is only included with the first content delivery sent from a server to a client. Upon receipt, the agent is loaded onto the client equipment and is used for each subsequent content delivery from the same server to the same client for the duration of the communication session between the client and that server. In general, agents can be created to handle different classes or types of content based upon the type of data provided or the software system involved in receiving the content. The agent for a given class of content only has to be delivered, loaded and executed once to each client for a given communication session.

Upon execution of the agent at the client, the desired client-side functionality is provided. In particular, execution of the agent provides client-side security for content delivered to the client and is resident, either temporarily or permanently, on the client side equipment. In one embodiment, the client-side security protects the delivered content from unauthorized access by third parties based upon the occurrence of one or more predefined conditions. Suitable predefined conditions include the detection of a predetermined period of time of no activity at the client side equipment, referred to as a time-out condition, a cessation of the communication session between the client and the server, receipt of requests for specific classes of content, e.g. classified or proprietary information, to be delivered from the server, access to the client-side equipment by unauthorized or unidentifiable third parties, power failures at either the client or server side, client initiated requests to secure the client side equipment, sever initiated requests to secure the client side equipment and combinations thereof. Preferably, the condition is a time-out condition.

Initially, one or more conditions to monitor for purposes of securing content on the client side are determined. In one embodiment, this determination is made by the server. Alternatively, the conditions are user-inputted through the client. In one embodiment, the monitored conditions are determined before the agent is created and are used in configuring the agent. In another embodiment, each agent is configured to monitor a single condition, and the determination of the desired condition for monitoring is used to select the previously configured agent to be embedded and delivered with the content. Alternatively, each agent is configured to monitor each one of a plurality of conditions, and the determination of the condition to be monitored is accomplished at the client after the agent has been delivered and uploaded by selecting one of more of the conditions.

Having identified the condition or conditions precedent to securing content on the client side, these conditions are regularly monitored during the communication session between the client and the server for an occurrence of the selected condition. In one embodiment, the condition is a time-out condition. In addition to selecting time-out as the condition, the period of desired non-activity is defined, and the client side equipment containing the exchanged content is monitored for user non-activity. Any suitable method for measuring inactivity of user equipment and for measuring the duration of the inactivity can be used. When the defined period of non-activity expires, the content is secured at the client side to prevent unauthorized access. Subsequent access to the client side content requires execution of a security authentication task such as entry of a password.

In one embodiment, in order to provide for the monitoring of the pre-determined conditions and to provide for securing of the content on the client side, systems and methods in accordance with the present invention are capable of reading from and writing to the content. When the delivered content includes web pages and HTML documents, user activities and other browser parameters are accessed through methods in JavaScript in HTML pages. To enable access to information from the current HTML pages, a mechanism is used that goes beyond the boundary of the Java Runtime Environment (JRE) of the applet and connects the applet with the JavaScript in the HTML pages. In one embodiment, this is achieved by using the LiveConnect facility, which is readily provided in most commercial browsers. In one embodiment, the LiveConnect facility provides a netscape.javascript.JSObject class, which permits applets to work with JavaScript to enable a way to access the document-object-model (DOM) of an HTML page. The applet performs the time-out protection function and utilizes the WebMailTimeOutProtectionAgent (WMTOPA) class. This WMTOPA class extends the AbstractWebContentAgent class and allows the applet to gain access to the content of HTML documents and web pages through the readContent and writeContent methods.

In one embodiment where the delivered content contains web pages and HTML documents, a system utilizing the LiveConnet facility provides a time-out condition protection function embedded in the content, e.g. a web page or HTML document, delivered to a client. The AbstractWebContent-Agent class provides a set of common functions to allow communication between the Java applet and JavaScript and access to the information or data of the HTML document or web page. Suitable methods provided in the AbstractWebContentAgent class include, but are not limited to Method List, Public String getContent( ) and Public Void writeContent( ). Suitable methods that are provided in WebMailTimeOutProtectionAgent, which is an extension of AbstractWebContentAgent, include MethodList and Public Void timeOutProtection( ). The readContent method is used to read the DOM of the HTML page, and the writeContent method is used to write data back to the original page. These two methods utilize the JSObject class to access the DOM of the HTML page.

One embodiment of reading from the HTML page using JSObject is illustrated in the following code.
    JSObject thisWindow=JSObject.getWindow(this);
    JSObject document=(JSObject) thisWindow.getMember ("document");
    JSObject myMember=(JSObject) document.getMember ("myMember");
      // get the member "myRef" as a string
      String s=(String) myMember.getMember("myRef");
One embodiment of writing to the HTML page using JSObject is illustrated in the following code.
    JSObject thisWindow=JSObject.getWindow(this);
    JSObject document=(JSObject) thisWindow.getMember ("document");
      String htmlText="myText";
      args=new Object[] {htmlText};
      document.call("write",args);

Once a condition has occurred indicating that the client-side content is to be secured, this content is secured or otherwise protected from access by unauthorized or unintended third parties. In one embodiment, the content is secured by storing the content locally at the client side and limiting access to the content. Although the content can simply be stored on the client-side equipment and access to the equipment password protected, preferably, the content is encrypted before storing. Suitable encryption methods include a double encryption algorithm. The double encryption algorithm uses public/private key mechanism.

In general, a public/private key mechanism contains public keys that are made public or broadcast publically throughout a network. A public key is associated with a particular client and is used by other clients in the network to encode messages that are sent to the client associated with the public key. Each public key has a corresponding private key. The private key is not broadcast but is maintained in private by the associated client. This client uses the private key to decrypt or decode messages that are sent through the network. Conversely, if a message has been encoded using a particular private key, then the public key is needed to decode or decrypt the message. In a network setting, storing a private key to decode a message could potentially expose the private key to unauthorized third parties, resulting in a breach of security. Therefore, the systems and method in accordance with the present invention utilize user passwords in combination with the public keys and private keys. In particular, user passwords are used as symmetric secret encryption keys to encrypt the private keys and store the private keys. The stored and encoded content is provided by entry of the password.

Referring to FIG. 1, an embodiment of the double encryption algorithm in accordance with the present invention is illustrated. As illustrated, the client 10 is running an Internet or World Wide Web browser application 12 for accessing web pages or HTML documents from one or more servers 14. However, the double encryption algorithm can be used in any network setting for delivery of content from a server to a client. Initially, the client 10 uses the browser 12 to send a request 16 for content from the server 14. Preferably, the browser is a Java technology-enabled browser. In response, the server 14 forwards or delivers 18 its home page 20 to the client 10, which is displayed on the client-side equipment, for example the client's computer monitor. The home page contains a prompt for entering a client password 22 and an agent 24. As illustrated, the agent is a Java applet. The client enters a password 26.

In one embodiment, the public/private key pair is generated by the server 14 following initial login and delivered to the client 10. The server 14 uses the login password entered by the client 10 as a symmetric secret encryption key to encrypt the private key. Alternatively, the public/private key is generated by the agent 24 at the client. The agent 24 uses the password entered by the client to encrypt the private key. The encrypted private key and the public key are stored at the client-side in the session cookie. The agent then forwards the login request to the server 28. The server verifies the login, i.e. the password entered by the client, and delivers the requested mail page to client 30. The delivered content is displayed on the client-side equipment 32.

The use of the public key and encrypted private key that are stored locally avoids the use of the user password for future encryption/decryption delivered content. Use of the user password for future encryption/decryption requires storing the unencrypted password locally, creating a potential breach of security. By keeping public key and the encrypted private key in the session cookie, the public key can be used to encrypt information as needed and to retrieve the encrypted private key for decryption when a user enters the same login password. Therefore, the double encryption method is both client and user specific, since each login session generates a unique encrypted private key and a unique public/private key pair.

Figure 2:
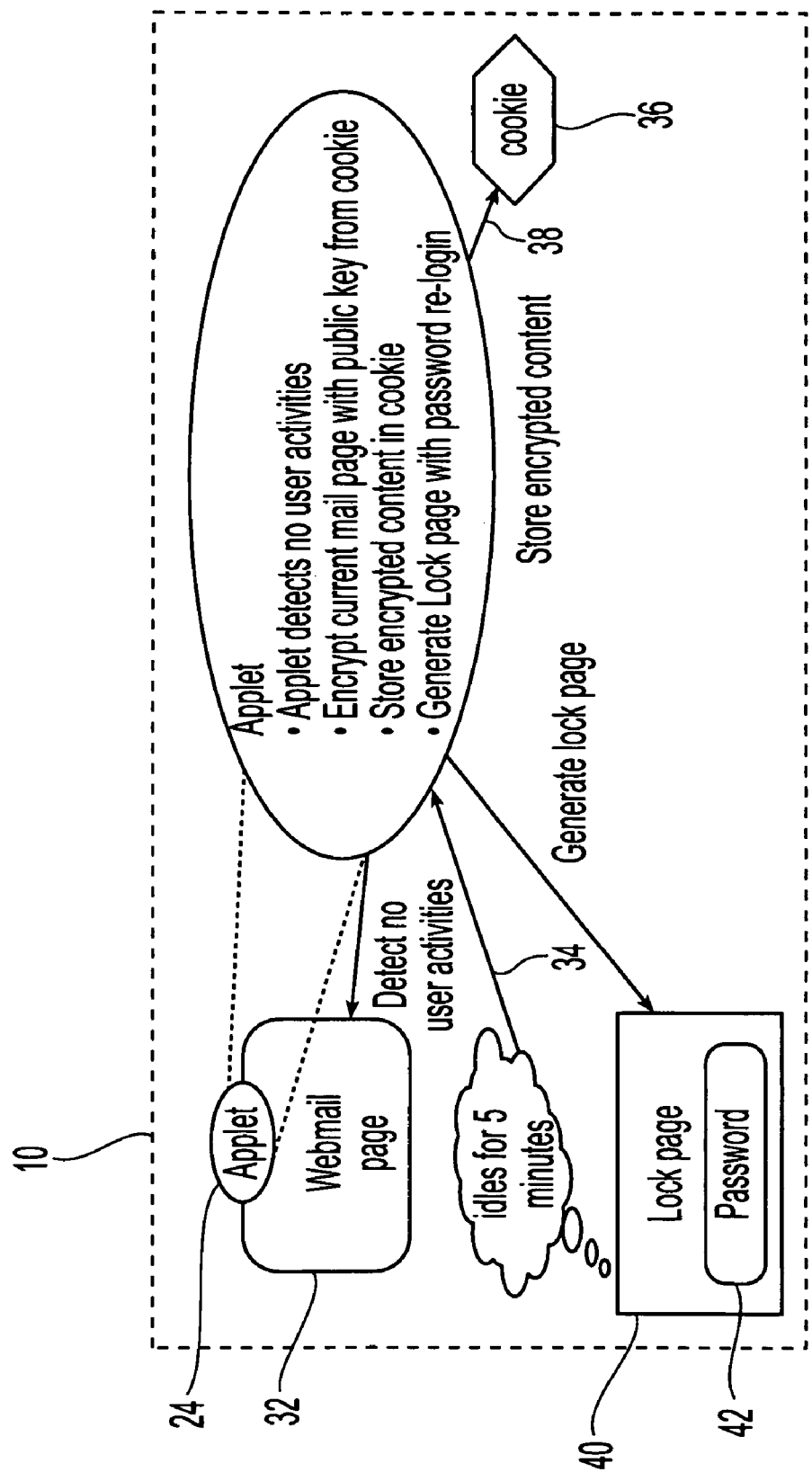
FIG. 2 is a schematic representation of local content encryption and storage in accordance with the present invention.

Referring to FIG. 2, an embodiment for securing delivered content at the client side in response to the occurrence of a pre-defined security condition is illustrated. In the embodiment as illustrated, the security condition is a time-out condition. The content 32 delivered to the client 10 is displayed on the client equipment, and the embedded agent 24 is loaded and executed. The agent 24 monitors activities at the client for compliance with the pre-determined security conditions. When the agent detects an occurrence of the security condition 34, e.g. no activities at the client equipment for a period of 5 minutes, the agent retrieves the public key from the cookie 36 and uses the public key to encrypt the content 32 displayed on the client equipment. The agent stores the encrypted content 38, preferably in the session cookie 26. The agent then generates a lock page 40 containing a password unlock prompt 42 for display on the client equipment. In order to return to the delivered content, the user must enter the password associated with the encrypted private key.

Figure 3:
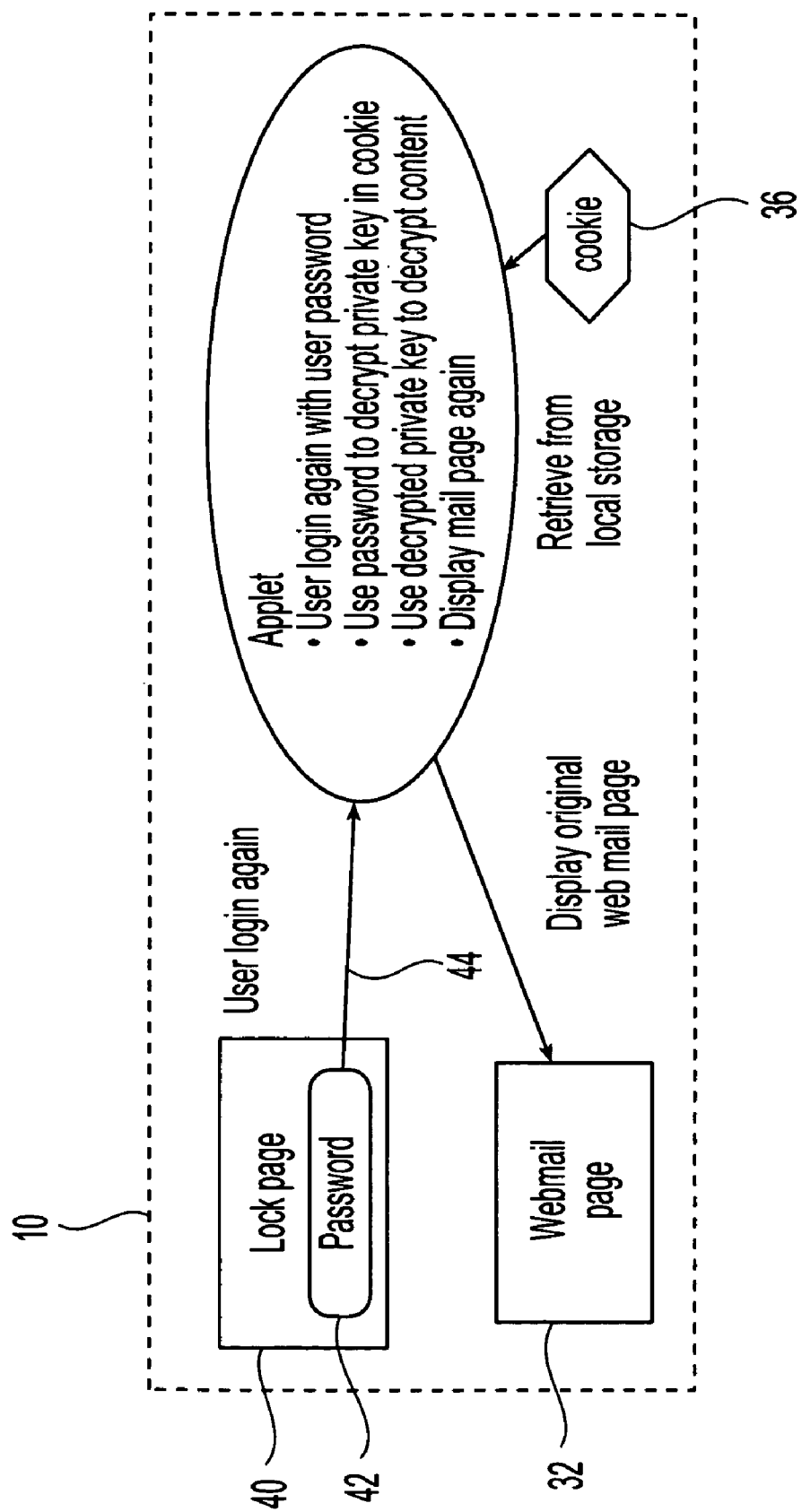
FIG. 3 is a schematic representation of local content retrieval and decryption in accordance with the present invention.

Referring to FIG. 3, an embodiment for retrieving and decrypting the content in accordance with the present invention is illustrated. The user enters the same password used to login to the server, and this password is forwarded to the agent 44. The agent retrieves the encrypted private key from the session cookie 36 and uses the password to decrypt the encrypted private key, yielding the private key. The agent also retrieves the encrypted content from session cookie 38 and uses the private key to decrypt the content. The agent then provides the content 32 to the client 48 for display on the client equipment. Once the decrypted content is delivered to the client, for display on the client side equipment, the client is again monitor for occurrence of any of the conditions.

The systems and methods in accordance with the present invention store the content locally, avoiding security exposure by encrypting the information using a public/private key mechanism together with the user password. The generation of the encrypted private key using the user password as a symmetric secret encryption key guarantees that the original private key is securely stored locally. The original private key can be readily recovered when a user enters the password to unlock the page.

The security functions are provided by the agent embedded in the delivered content. Different agents can be embedded in different content depending on the data or information contained in the content and the specific needs of the client, server and network. The content is securely stored locally, providing user access and retrieval of stored content even where there is no current connection between the server and the client.

The present invention is also directed to a computer readable medium containing a computer executable code that when read by a computer causes the computer to perform a method for providing security for content delivered to a client across a network at the client side in accordance with the present invention and to the computer executable code itself. The computer executable code can be stored on any suitable storage medium or database, including databases in communication with and accessible by the servers and clients, and can be executed on any suitable hardware platform as are known and available in the art. The storage medium can be located in one or more servers or clients or can be a located independent of the servers and clients and accessible by the servers and clients across the network.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A method for providing client-side security for delivered content in a network, the method comprising:
   embedding an agent in content to be delivered to a client across a network;
   delivering the content containing the embedded agent to the client; and
   utilizing the agent embedded in the content delivered to the client across the network to provide security at the client for the delivered content by:
      executing the agent at the client to provide client-side security;
      monitoring for an occurrence of a security condition;
      encrypting the delivered content using a public key upon an occurrence of the security condition; and
      encrypting a private key corresponding to the public key using a client password;
   wherein the agent is configured in accordance with application specific factors.

2. The method of claim 1, wherein the agent comprises a Java applet.

3. The method of claim 1, wherein the application specific factors comprise the client, the delivered content, software resident at the client and combinations thereof.

4. The method of claim 1, wherein the step of utilizing the embedded agent comprises:
   determining one or more security conditions that necessitate securing the delivered content; and
   configuring the embedded agent to monitor for the determined security conditions.

5. The method of claim 4, wherein the security conditions that necessitate securing the delivered content comprise a pre-determined period of inactivity at client equipment containing the delivered content; and
   the step of monitoring for occurrence of the security condition comprises measuring the duration of any periods of inactivity at the client equipment.

6. The method of claim 1, wherein the step of utilizing the embedded agent comprises:
   storing the encrypted delivered content at the client upon occurrence of a pre-determined condition.

7. The method of claim 1, wherein the method further comprises:
   delivering a password from the client to a server to login to that server;
   generating a private key and a corresponding public key at the server;
   forwarding the private key and public key to the client; and
   storing the public key, the encrypted content and the encrypted private key at the client;
   the step of encrypting the content comprises encrypting the content using the forwarded public key; and
   the step of encrypting the private key further comprises encrypting the private key using the delivered password.

8. The method of claim 1, wherein the method further comprises:
   generating a private key and a corresponding public key at the client; and
   storing the public key, the encrypted content and the encrypted private key at the client;
   the step of encrypting the private key further comprises encrypting the private key using the generated password; and
   the step of encrypting the content further comprises encrypting the content using the generated public key.

9. The method of claim 8, wherein the step of storing the public key and encrypted private key comprises storing in a session cookie.

10. The method of claim 8, further comprising:
    logging the client off the server; and
    displaying a password entry prompt at the client.

11. The method of claim 8, further comprising:
    decrypting the public key encrypted content using the public key, the encrypted private key and the original login password; and
    delivering the decrypted content to the client.

12. The method of claim 8, further comprising:
    entering original login password at client;
    retrieving encrypted private key;
    decrypting encrypted private key using password;
    decrypting public key encrypted content using decrypted private key;
    delivering decrypted content to the client; and
    monitoring for an occurrence of the condition following delivery of the decrypted content.

13. A computer readable storage medium containing a computer executable code that when read by a computer causes the computer to perform a method for providing client-side security for delivered content in a network, the method comprising:
    embedding an agent in content to be delivered to a client across a network;

delivering the content containing the embedded agent to the client; and utilizing the agent embedded in the content delivered to the client across the network to provide security at the client for the delivered content by:

executing the agent at the client to provide client-side security;

monitoring for an occurrence of a security condition;

encrypting the delivered content using a public key upon an occurrence of the security condition; and encrypting a private key corresponding to the public key using a client password;

wherein the agent is configured in accordance with application specific factors.

14. The computer readable storage medium of claim 13, wherein the agent comprises a Java applet.

15. The computer readable storage medium of claim 13, wherein the application specific factors comprise the client, the delivered content, software resident at the client and combinations thereof.

16. The computer readable storage medium of claim 13, wherein the step of utilizing the embedded agent comprises: determining one or more security conditions that necessitate securing the delivered content; and configuring the embedded agent to monitor for the determined security conditions.

17. The computer readable storage medium of claim 16, wherein the security conditions that necessitate securing the delivered content comprise a pre-determined period of inactivity at client equipment containing the delivered content; and the step of monitoring for occurrence of the security condition comprises measuring the duration of any periods of inactivity at the client equipment.

18. The computer readable storage medium of claim 13, wherein the step of utilizing the embedded agent comprises: storing the encrypted delivered content at the client upon occurrence of a pre-determined condition.

19. The computer readable storage medium of claim 13, wherein the method further comprises:

delivering a password from the client to a server to login to that server;

generating a private key and a corresponding public key at the server;

forwarding the private key and public key to the client; and storing the public key, the encrypted content and the encrypted private key at the client;

the step of encrypting the content comprises encrypting the content using the forwarded public key; and the step of encrypting the private key further comprises encrypting the private key using the delivered password.

20. The computer readable storage medium of claim 13, wherein the method further comprises:

generating a private key and a corresponding public key at the client; and storing the public key, the encrypted content and the encrypted private key at the client;

the step of encrypting the private key further comprises encrypting the private key using the generated password; and the step of encrypting the content further comprises encrypting the content using the generated public key.

21. The computer readable storage medium of claim 20, wherein the step of storing the public key and encrypted private key comprises storing in a session cookie.

22. The computer readable storage medium of claim 20, further comprising: logging the client off the server; and displaying a password entry prompt at the client.

23. The computer readable storage medium of claim 20, further comprising: decrypting the public key encrypted content using the public key, the encrypted private key and the original login password; and delivering the decrypted content to the client.

24. The computer readable storage medium of claim 20, further comprising: entering original login password at client; retrieving encrypted private key; decrypting encrypted private key using password; decrypting public key encrypted content using decrypted private key; delivering the decrypted content to the client; and monitoring for an occurrence of the condition following delivery of the decrypted content.

* * * * *